United States Patent Office 3,231,597
Patented Jan. 25, 1966

3,231,597
POLYURETHANE PREPARATION
James Rodney Fischer, Monrovia, Calif., assignor to Aerojet-General Corporation, Azusa, Calif., a corporation of Ohio
No Drawing. Filed July 3, 1957, Ser. No. 670,845
22 Claims. (Cl. 260—455)

This invention relates to an improved method of preparing polyurethanes. In particular, the invention relates to a catalyst for the preparation of polyurethanes which is a chelate having the general formula:

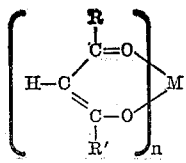

wherein R and R' are monovalent organic radicals, M is a metal radical having a coordination number equal to twice its electrovalence, and $n$ is an integer which corresponds to the electrovalence of M.

The polyurethanes prepared according to the method of this invention are useful for a variety of purposes. A particularly useful class of polyurethanes which are prepared with the aid of my improved catalyst are those containing nitro groups such as the polyurethanes disclosed in my copending United States patent application Serial No. 422,649, filed April 12, 1954, now abandoned. These nitro-containing polyurethanes are useful as smokeless solid propellants which can be used as a primary propulsion source in rocket propelled vehicles, and can also be used as a propellant for artillery missiles. When used as the primary propulsion source for rocket vehicles, they can be conveniently ignited by a conventional igniter, as for example the igniter disclosed in assignee's copending patent application Serial No. 306,030, filed August 23, 1952, now U.S. Patent S.N. 3,000,312. The propellant is preferably cast in tubular form and restricted in the conventional manner with a relatively inert resin, such as a non-nitrated polyurethane foam or a polyester resin, and placed inside a chamber having one end open and leading into a conventional venturi rocket nozzle. Upon ignition, large quantities of gases are produced and exhausted through the nozzle, creating propulsive force.

The polyurethanes which are prepared with the aid of my new improved catalyst are obtained by reacting organic compounds having as the sole reacting groups isocyanate groups with other organic compounds containing as the sole reacting groups hydroxyl groups, in accordance with the reaction scheme set forth below:

$y$(HO—R''—OH) + $y$(OCN—R'''—NCO) ⟶

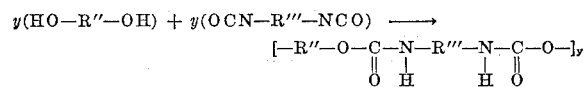

wherein R'' and R''' are divalent organic radicals which may be the same or different, and $y$ is the number of repeating units in the polymer chain. In preparing nitropolyurethanes according to the above reaction scheme, either the isocyanate monomers, the hydroxy containing monomers, or both may contain nitro groups.

Heretofore various catalysts for the polyurethane reaction have been used, a particular example of which are tertiary amines such as triethylamine. Although these catalysts are useful to a certain extent for some polyurethane reactions, they are unsatisfactory for the preparation of nitropolyurethanes such as those described in my copending United States patent application Serial No. 422,649. Tertiary amines are completely unsatisfactory for preparing these nitropolyurethanes since they react with the nitro groups and thus have a deleterious effect.

I have found that chelates having the structural formula:

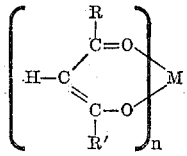

wherein R, R', M, and $n$ are as previously identified, are excellent reaction rate catalysts for the polyurethane polymerization reaction. These chelates are not only greatly superior to the previously known catalysts for the polyurethane reaction, but in the case of the nitro-containing polyurethanes they represent a great and substantial improvement over previous catalysts such as tertiary amines, since they can be used without danger of deleterious reaction between them and the nitro groups present.

The chelates which are useful as catalysts according to the present invention are non-polar compounds which are soluble in the organic media sometimes employed in the preparation of polyurethanes. The preferred chelate for my purpose is ferric acetylacetonate, but there are a great number of other chelates which are also useful for my purpose.

Following are examples which are included for the purpose of clearly illustrating my invention. These examples are intended for illustrative purposes only, and are not to be construed as limiting the invention to the particular conditions set forth therein.

EXAMPLE I

This is a control test in which no catalyst was employed.

A solution of 3,3-dinitro-1,5-pentane diisocyanate and 2-nitro-2-methyl-1,3-propanediol in anhydrous dioxan containing 1.0 meq./ml. of each monomer was prepared. Two hundred ml. of this solution was placed in a constant temperature bath maintained at a temperature of about 50° C., and ten ml. samples were periodically removed therfrom for (—NCO) analysis. In the method of analysis the ten ml. sample of solution was added to a solution of standard di-n-butylamine-dioxan, the di-n-butylamine being present in excess of the (—NCO) in the sample. Each sample of di-n-butylamine solution containing the ten mls. of (—NCO) solution was then back-titrated with standard acid to a pH of 5.0. At the same time a blank determination was run on the di-n-butylamine solution after which the difference in titer between the sample containing the (—NCO) and the blank sample was determined, which difference corresponded to the amount of unreacted (—NCO) present in the solution being analyzed.

The experimental results of the (—NCO) analyses of this example are given below in Table I.

*Table I*

| Elapsed time, hrs.: | Equivalents of (—NCO) present |
|---|---|
| 0 | 0.200 |
| 0.5 | 0.199 |
| 1.5 | 0.199 |
| 19.0 | 0.198 |
| 90.0 | 0.191 |

From the results of Table I the degree of polymerization, hereinafter referred to as D.P., was calculated for each interval of time represented therein. The D.P. is defined as the available number of structural units or monomers in the polymers formed after a certain time interval. This calculation was made from the analytical results of Table I by dividing the number of equivalents initially present by those present after the stated interval, as determined by analysis.

The reaction rate constant, K, for the polymerization reaction of this example was evaluated and found to be 0.053 liter/eq. hr. The reaction rate constant for a reaction such as that of this example can be determined from D.P. vs. elapsed time data by dividing the slope of the plot of D.P. vs. elapsed time by the concentration of (—NCO) equivalents in the initial solution of monomers. As those skilled in the art realize, the value of K is a measure of the rate of the reaction involved, the greater the value of K, the higher the reaction rate.

EXAMPLE II

In this example the rate of reaction of the same diisocyanate and diol monomers as those of Example I to form a polyurethane in the presence of boron trifluoride etherate as a reaction rate catalyst was studied.

The procedure described in Example I was followed except that an amount of boron trifluoride etherate equal in equivalent quantity to 2% of the equivalent of (—NCO) present was added to the solution containing the reactants before the solution was placed in the 50° C. bath. The solution of reactants was periodically analyzed for (—NCO) by the method described in Example I.

The analytical results are given below in Table II.

*Table II*

| Elapsed time, hrs.: | Equivalents of (—NCO) present |
|---|---|
| 0 | 0.200 |
| 0.5 | 0.180 |
| 1.5 | 0.160 |
| 19.0 | 0.102 |
| 90.0 | 0.083 |

Comparison of the results shown in Table II with those of Table I shows that the presence of the boron trifluoride etherate, a commonly used catalyst for polyurethane reactions, substantially increased the rate of reaction between the diisocyanate and the diol to form a polymerized polyurethane product. Thus, at the end of 90 hours the sample containing the boron trifluoride etherate contained only 0.083 equivalent of (—NCO) as compared to the 0.191 equivalent of (—NCO) present in the mixture of Example I, containing no catalyst, after this same period of time.

EXAMPLE III

In this example the effect of chromium acetylacetonate on the rate of polymerization of the diisocyanate and the diol used in Examples I and II was studied.

A procedure similar to that of Example II, except that chromium acetylacetonate in the same equivalent amount was substituted for the boron trifluoride etherate catalyst used therein.

The analytical results of the monomer solution after periodic intervals of time were obtained and are shown in Table III below.

*Table III*

| Elapsed time, hrs.: | Equivalents of (—NCO) present |
|---|---|
| 0 | 0.200 |
| 0.5 | 0.110 |
| 1.5 | 0.075 |
| 19.0 | 0.019 |
| 90.0 | 0.004 |

Comparison of the results of Table III with those of Tables I and II shows that the presence of the chromium acetylacetonate had a marked effect on the polymerization rate of the monomers. Thus, in the present example, at the end of 90 hours of reaction there remained in the solution only 0.004 equivalent of (—NCO) as compared to 0.083 equivalent which were present in the Example II solution containing the boron trifluoride etherate and the 0.191 equivalent present after 90 hours in the Example I solution containing no catalyst.

EXAMPLE IV

This example is similar to Example III, except that vanadyl acetylacetonate was used instead of chromium acetylacetonate as the catalyst.

The procedure of Example III was followed, except that vanadyl acetylacetonate, in the same equivalent quantity, was used as the catalyst instead of chromium acetylacetonate. The monomer solution was analyzed for (—NCO) periodically as in the previous examples, and the results of these analyses appear below in Table IV.

*Table IV*

| Elapsed time, hrs.: | Equivalents of (—NCO) present |
|---|---|
| 0 | 0.200 |
| 0.5 | 0.002 |
| 1.5 | 0.002 |
| 19.0 | ---- |

Comparison of the results of Table IV with those of Table III shows that the vanadyl acetylacetonate was substantially more effective in increasing the polymerization rate of the monomers than was the chromium acetylacetonate.

EXAMPLE V

This is an example of the use of ferric acetylacetonate as a catalyst for the polymerization of 3,3-dinitro-1,5-pentane diisocyanate and 2-nitro-2-methyl-1,3-propanediol to form polyurethane.

A solution of the aforesaid diisocyanate and diol in anhydrous dioxan, in which the monomer concentration of each was 0.940 equiv./liter, was prepared. An amount of ferric acetylacetonate equal to a concentration of $1 \times 10^{-5}$ mole/liter was added to the solution of monomers in dioxan. The solution was maintained in a constant temperature bath at a temperature of about 50° C., and samples were periodically removed therefrom for (—NCO) analysis by the procedure described in Example I. The D.P. after various time intervals, was calculated from the analytical data by the method described in Example I.

Table V below gives the D.P. vs. elapsed time data for this example.

*Table V*

| Elapsed time, hrs.: | D.P. |
|---|---|
| 0.25 | 1.87 |
| 0.75 | 3.70 |
| 1.25 | 5.20 |
| 1.75 | 7.25 |
| 3.00 | 11.0 |
| 4.00 | 14.5 |
| 5.00 | 18.0 |

The reaction rate constant, K, was calculated for this example to be 3.62 liters/equiv. hr. which is substantially larger than the $5.3 \times 10^{-2}$ value for K in Example I in which no catalyst was employed, thus indicating that the presence of the ferric acetylacetonate substantially increased the reaction rate.

EXAMPLE VI

This example is substantially the same as Example V, except that the amount of ferric acetylacetonate employed was $1 \times 10^{-4}$ moles/liter instead of $1 \times 10^{-5}$ moles/liter, as in the latter case.

Table VI below gives values for the D.P. of the mixture after various time intervals, calculated from the (—NCO) analyses as explained in Example I.

Table VI

| Elapsed time, hrs.: | D.P. |
|---|---|
| 0.25 | 20 |
| 0.75 | 29 |
| 1.25 | 35 |
| 1.75 | 54 |
| 3.00 | 63 |
| 4.00 | 94 |
| 5.00 | 125 |

The reaction rate constant, K, calculated from the above data was 26.4 liters/equiv. hr. which is indicative of a greatly increased rate of reaction over that of Example V. The increased reaction rate was attributable to the additional amount of ferric acetylacetonate used in the present example.

EXAMPLE VII

In this example the rate of polymerization of 2-nitraza-1,4-butane diisocyanate and 2-nitro-2-methyl-1,3-propanediol to form polyurethane in the absence of a catalyst was determined.

A solution of 23.28 gm. of 2-nitraza-1,4-butane diisocyanate and 16.89 gm. of 2-nitro-2-methyl-1,3-propanediol in 250 ml. of absolute dioxan was prepared. This solution contained 1 equiv./liter each of (—OH) and (—NCO). A 50 ml. portion of this solution was removed and ½ ml. of dioxan added thereto (to the 50 ml. portion) to adjust the concentration of monomers to that of solutions used in comparative tests in which catalysts were added. The resulting 50.5 ml. of solution was placed in a constant temperature bath and maintained for a period of time at 50° C., during which 10 ml. portions were periodically removed for (—NCO) determination by the method described in Example I. The time intervals when (—NCO) analyses were made and the resulting D.P. data appear below in Table VII.

Table VII

| Elapsed time, hrs.: | D.P. |
|---|---|
| 0 | 1.00 |
| 1.5 | 1.04 |
| 2.5 | 1.08 |

The reaction rate constant, K, for this example was calculated from the above data to be 0.03 liter/equiv. hr.

EXAMPLE VIII

To a 100 ml. portion of the 250 ml. of dioxan solution of the monomers 2-nitraza-1,4-butane diisocyanate and 2-nitro-2-methyl-1,3-propanediol, referred to in Example VII, was added 1 ml. of a dilute solution of ferric acetylacetonate in absolute dioxan. The concentration of the dilute ferric acetylacetonate solution was such that the ferric acetylacetonate was present in the monomer solution in a concentration of $1 \times 10^{-5}$ equivalents per liter after addition of the 1 ml. of ferric acetylacetonate solution thereto. The monomer solution containing the ferric acetylacetonate was then placed in a 50° C. temperature bath and maintained therein for a 3 hour period of time, during which 10 ml. portions were periodically removed and analyzed for (—NCO) by the method described in Example I. The values for D.P. corresponding to the (—NCO) analytical results were then calculated. Table VIII gives the D.P. vs. elapsed time data for this example.

Table VIII

| Elapsed time, hrs.: | D.P. |
|---|---|
| 0 | 1.00 |
| 0.5 | 2.28 |
| 1.0 | 3.43 |
| 1.5 | 4.31 |
| 2.0 | 5.18 |
| 2.5 | 6.00 |
| 3.0 | 6.80 |

The reaction rate constant, K, for this example was determined to be 2.0 liters/equiv. hr. Comparison of this value of K with that of Example VII indicates the greatly increased reaction rate attributable to the presence of the ferric acetylacetonate catalyst in the present example.

EXAMPLE IX

In this example the reaction rate of 3-nitraza-1,5-pentane diisocyanate and 2-nitro-2-methyl-1,3-propanediol in the absence of a catalyst was determined.

A solution of 3-nitraza-1,5-pentane diisocyanate and 2-nitro-2-methyl-1,3-propanediol in dioxan containing one equivalent per liter of each of these monomers was prepared. A portion of this solution was placed in a constant temperature bath and maintained at 50° C. therein for four and one half hours. After four and one half hours in the bath, a sample of the solution was analyzed for (—NCO) and the D.P. then determined. The D.P. was found to be 1.01, thus indicating that the reaction had proceeded at a very slow rate. The reaction rate constant, K, for the polymerization reaction of this example was found to be 0.002 liter/equiv. hr.

EXAMPLE X

A procedure similar to that of Example IX was followed, the only difference being that in the present example ferric acetylacetonate was added to the monomer solution prior to placing it in the constant temperature bath, in an amount such that the concentration of the ferric acetylacetonate in said monomer solution was $1 \times 10^{-5}$ moles per liter. Samples were removed from the solution periodically, over a period of four and one half hours, and analyzed for (—NCO) as in the previous examples. From the analytical results values for D.P. were obtained and a reaction rate constant, K, was then determined. For this example K was found to be 0.35 liter/equiv. hr. which, when compared with the K of the previous example (0.002 liter/equiv. hr.), shows the marked increase in reaction rate attributable to the presence of the ferric acetylacetonate.

EXAMPLE XI

In this example the catalytic effect of the acetylacetonates of various metals on the rate of polymerization of 3-nitraza-1,5-pentane diisocyanate and 2-nitro-2-methyl-1,3-propanediol was determined.

A series of solutions of 3-nitraza-1,5-pentane diisocyanate and 2-nitro-2-methyl-1,3-propanediol in dioxan, each having a normality of 1 with respect to 3-nitraza-1,5-pentane diisocyanate and to 2-nitro-2-methyl-1,3-propanediol, and all but one having a metal acetylacetonate incorporated therein as a polymerization rate catalyst, was prepared. These solutions were each placed in a constant temperature bath and maintained at 50° C. therein for a period of time, during which (—NCO) analytical data were obtained at various intervals of time. The reaction rate constants were then obtained, from the analytical data, for each of the systems.

Table IX gives the values of K for each of the solutions of this example.

Table IX

| Catalyst | Concentration of Catalyst (mole/liter) | K (liters/equiv. hr.) |
|---|---|---|
| None | | $4 \times 10^{-4}$ |
| Beryllium Acetylacetonate | $10^{-3}$ | $3.8 \times 10^{-2}$ |
| Cerrous Acetylacetonate | $10^{-3}$ | 5.6 |
| Do | $10^{-4}$ | 0.87 |
| Do | $10^{-5}$ | $2.06 \times 10^{-2}$ |
| Zirconium Acetylacetonate | $10^{-5}$ | 0.217 |
| Ferric Acetylacetonate | $10^{-5}$ | 4.5 |
| Do | $5 \times 10^{-6}$ | 0.442 |
| Do | $10^{-6}$ | 0.0275 |
| Aluminum Acetylacetonate | $10^{-3}$ | 1.23 |
| Do | $10^{-4}$ | 0.178 |
| Do | $3 \times 10^{-5}$ | 0.085 |
| Do | $10^{-5}$ | 0.030 |
| Palladous Acetylacetonate | $10^{-4}$ | 0.007 |
| Thorium Acetylacetonate | $10^{-4}$ | 3.2 |
| Do | $10^{-5}$ | 0.12 |

The results in the above table show that, in every case, the catalyst employed increased the rate of reaction over the rate in which no catalyst was used. The use of ferric acetylacetonate, even in a concentration as low as one millionth of a mole per liter, resulted in a substantial increase in the rate of reaction.

EXAMPLE XII

This example shows the use of metal chelates within the scope of this invention, other than acetylacetonates as catalysts for the polymerization of 3-nitraza-1,5-pentane diisocyanate and 2-nitro-2-methyl-1,3-propanediol to polyurethane.

Four samples of solutions of 3-nitraza-1,5-pentane diisocyanate and 2-nitro-2-methyl-1,3-propanediol, 1 normal in each of these monomers, and each containing a catalyst as specified hereinafter, in dioxan were prepared. Each of these samples was placed in a constant temperature bath and maintained at 50° C. therein for an extended period of time, during which samples were periodically removed for (—NCO) analysis by the method previously described. From the analytical results the values of the reaction rate constant, K, for each of the four systems was determined. The reaction rate data appear in Table X below. In two of the samples the rate of reaction decreased after a certain period of time and subsequently remained fairly constant; hence there will be two K's given in the table for the two particular catalysts which exhibited this property.

*Table X*

| Catalyst | Concentration of Catalyst (mole/liter) | K (liters/equiv. hr.) | |
|---|---|---|---|
| bis(Dibenzoylmethane)Cu(II) | $1 \times 10^{-5}$ | 0.44 | 0.06 |
| bis(Ethyl acetoacetate)Cu(II) | $1 \times 10^{-5}$ | 1.84 | 0.05 |
| tris(Dibenzoylmethane)Fe(III) | $1 \times 10^{-5}$ | 4.8 | |
| tris(Dibenzoylmethane)Fe(III) | $1 \times 10^{-4}$ | 7.6 | |
| tris(Dibenzoylmethane)Fe(III) | $1 \times 10^{-6}$ | 0.03 | |

The above results, when compared with the result shown in Table IX in which no catalyst was used, indicate that all of the catalysts tested produced substantial increases in rate over the rate of the same polymerization reaction in the absence of a catalyst.

EXAMPLE XIII

This is an example of the formulation of a nitropolyurethane, suitable as a binder for a propellant casting, using a chelate within the scope of the present invention as a polymerization catalyst.

Thirty and six-tenths grams (0.306 eq.) of 3-nitraza-1,5-pentane diisocyanate, 1.2 gm. (0.024 eq.) of tris-(hydroxymethyl)-nitromethane, and 32.8 gm. of 4-nitrazapentanonitrile are mixed and heated under vacuum at 50° C. until bubbling ceases. The tris-(hydroxymethyl)nitromethane is present as a crosslinker and the 4-nitrazapentanonitrile as a plasticizer. To the resulting degassed mixture there is added 22.9 gm. of 2,2-dinitro-1,3-propanediol. A spiral blade stirrer is fitted into the mixing vessel and the mixture is further degassed at 50° C., while being stirred, for about one hour until bubbling ceases. The degassed mixture is allowed to cool, at room temperature, while being stirred with the spiral blade stirrer under vacuum. Ammonium perchlorate is added portionwise until a total of 198 gm. has been incorporated in the mix. The mixture is then stirred under vacuum for about ½ hour, after which it is substantially homogeneous. An amount of a 1% solution of ferric acetylacetonate in 4-nitrazapentanonitrile containing 46 mg. of the ferric acetylacetonate is added to the monomer mixture, after which the mixture is stirred for about five minutes to disperse the ferric acetylacetonate therein. The ferric acetylacetonate acts as a catalyst for the polymerization reaction of this example. During the stirring operation some heat of reaction occurs, but it quickly subsides.

The mixture is then transferred to a waxed test tube with the aid of a vibrator. The tube containing the mix is placed in a 110° F. oven and cured therein for about sixteen hours. The cured mixture exhibits good high temperature properties, and it is flexible and firm, and suitable as a propellant. Without the catalyst the material would have required several weeks of curing time instead of the sixteen hours actually employed.

EXAMPLE XIV

An amount of 3-nitraza-1,5-pentane diisocyanate equal to 10.21 gm. is placed in a tube along with 51.74 gm. of polyglycidylnitrate (triol-initiated) and 12.39 gm. of 2,2-dinitropropyl-4-nitrazapentanoate, and the resulting mixture heated under vacuum at 50° C. until bubbling ceases. The 2,2-dinitropropyl-4-nitrazapentanoate is present as a plasticizer. A spiral blade stirrer is inserted in the tube and the mixture is stirred, while maintained at 50° C., until bubbling ceases. The mixture of monomers, together with the spiral blade mixing apparatus, is placed in a room temperature environment and the mixture is allowed to cool under vacuum with stirring. An amount of ammonium perchlorate equal to 141.4 gm. is added portionwise to the mixture, after which it is stirred under vacuum for about half an hour until it is homogeneous. An amount of 10% solution of ferric acetylacetonate in dimethyl phthalate, equal to 0.35 ml., is added to the mixture. The mixture is stirred for an additional five minutes, during which some heat of reaction occurs, but quickly subsides. The mixture is then transferred to a waxed test tube with vibration, and the tube is placed in an oven maintained at 110° F. The cast mixture is cured for a period of about seventy-two hours. The cured nitropolyurethane casting in the test tube exhibits good high temperature properties and is flexible and rubbery.

Here again, as in the previous example, the polymerized nitropolyurethane is possessed of suitable physical properties to act as binders in rocket propellant grains.

EXAMPLE XV

This is an example of the preparation of a polyurethane from a non-nitrated diisocyanate and a non-nitrated diol.

An amount of 2,4-toluene diisocyanate equal to 5.26 gm. is placed in a mixing tube along with 44.32 gm. of polypropylene glycol and 0.38 gm. of trimethylolpropane. The tube is fitted with a spiral blade stirrer and the mixture therein stirred until bubbling ceases at a temperature of about 50° C. The apparatus and mixture is next transferred to room temperature and the mixture allowed to cool under vacuum, with stirring. An amount of ferric acetylacetonate equal to 21.2 mg. is added to the mixture, after which it is stirred for about five minutes to disperse the catalyst therein. At this point some heat of reaction occurs, but it quickly subsides.

The resulting mixture is then transferred to a waxed test tube with the aid of vibration, and the tube placed in an oven maintained at 110° F. The mixture in the waxed test tube is allowed to cure for a period of about twenty-four hours, after which the polymerized casting exhibits good physical and thermal properties, and has suitable low temperature and high temperature physical properties for use as a binder in a solid propellant grain. The material is flexible, resilient and tough. The monomer formulation in this example would have required several weeks to cure had not the ferric acetylacetonate catalyst been present.

It is evident from the reaction scheme set forth hereinbefore that a wide variety of polyurethanes can be prepared with the aid of my chelate catalysts simply by varying the particular hydroxy and isocyanate components used in the reaction. The isocyanates should preferably be diisocyanates, although not necessarily so. Other isocyanates such as triisocyanates may be employed if desired. The isocyanates can be either nitrated or non-nitrated, however the catalyst of this invention is particularly useful when employed with nitrated isocyanates since it does not react with the nitro group as do other commonly used polyurethane catalysts, particularly the tertiary amines such as triethylamine.

The hydroxy containing monomers used to form the polyurethanes are preferably diols, although other polyhydroxy compounds such as, for example, triols can be employed if desired. The polyol compounds may be short chain ones having relatively low molecular weights, or they can be long chain compounds of high molecular weight. The polyols can be either nitrated or non-nitrated, however my catalyst is particularly useful when employed with nitrated polyols for the same reason that it is particularly useful with nitrated isocyanates.

The polyurethanes formed in the presence of my novel catalysts can comprise either linear polymers or crosslinked polymers. The linear polymers are those formed from appropriate isocyanates and polyols without the addition of any crosslinking agent. That is, they are merely linear chains composed of alternate isocyanate and polyol monomers. The crosslinked polymers, on the other hand, are prepared by employing a crosslinking agent in addition to the isocyanate and polyol monomers, which acts as a bridge between the linear isocyanate-polyol polymers, thus bonding these polymers together. Any suitable crosslinking agent, such as a triol, glycerol, trimethylolpropane, tris(hydroxymethyl)nitromethane, etc., may be used.

The polyurethane reaction is well known to those skilled in the art, and many isocyanates and polyols which polymerize to yield polyurethanes have been disclosed in various patents such as United States Patent No. 2,284,637, issued June 2, 1942, to Willard E. Catlin. Consequently, further discussion here of the details of this polymerization reaction and the reactants involved is considered unnecessary.

Plasticizers may be incorporated into the polyurethanes of this invention if desired. Any suitable plasticizer, familiar to those skilled in the art, such as 4-nitrazapentanonitrile, 2,2-dinitropropyl-4-nitrazapentanoate, as well as those commercially available as such may be employed.

Where the polyurethanes are to be employed as rocket propellants, an oxidizer may be incorporated therein if desired. Any suitable oxidizer, well known to those skilled in the art, such as ammonium perchlorate, or $NH_4NO_3$ may be used.

The polyurethane reaction may be carried out in a suitable solvent, or in the absence of any such solvent. The solvent may be present in such great excess as to form a solution of the monomers, or may be used in small quantities such as that accompanying the catalyst, if the catalyst is employed in solution form, or it may be entirely absent from the system. Suitable solvents should be those in which the various ingredients of the mixture are soluble, such as 4-nitrazapentanonitrile, dioxan, dimethylphthalate, etc.

The chelate catalysts of this invention can be used in quantities within the range from mere traces up to amounts equivalent to about one percent by weight of the total mass, and even higher.

The polyurethane polymerization reaction can be effectively carried out at any temperature, the only effect of temperature variation being a corresponding change in the rate of reaction. The polymerization can be effected at room temperature, although higher temperatures increase the rate and might be desirable in certain cases; however, the polymerization will take place at temperatures much below room temperature, and thus temperature is not a critical variable.

As previously disclosed, a great variety of isocyanates can be polymerized with a great variety of hydroxy containing compounds in the presence of my new chelate catalyst, and thus obtain the benefit in rate of polymerization attributable to the catalyst. For example, polymethylene diisocyanates such as ethylene diisocyanate, trimethylene diisocyanate, tetramethylene diisocyanate, hexamethylene diisocyanate, decamethylene diisocyanate, etc.; alkylene diisocyanates such as propylene-1,2-diisocyanate, butylene-1,2-diisocyanate, butylene-1,3-diisocyanate, butylene-2,3-diisocyanate, etc.; alkylidene diisocyanates such as ethylidene diisocyanate, propylidene-1,1-diisocyanate, propylidene-2,2-diisocyanate, etc.; cycloalkylene diisocyanates such as cyclopentylene-1,3-diisocyanate, cyclohexylene-1,2-diisocyanate, cyclohexylene-1,3-diisocyanate, cyclohexylene-1,4-diisocyanate, etc.; cycloalkylidene diisocyanates such as cyclopentylidene diisocyanate, cyclohexylidene diisocyanate, etc.; aromatic diisocyanates such as o-phenylene diisocyanate, p-phenylene diisocyanate, 1-methyl-2,4-phenylene diisocyanate, naphthylene-1,4-diisocyanate, diphenylene-4,4'-diisocyanate, etc.; or aliphatic-aromatic diisocyanates such as xylylene-1,4-diisocyanate, xylylene-1,3-diisocyanate, 4,4'-diphenylenemethane diisocyanate, 4,4'-diphenylenepropane diisocyanate, etc. polymerize with hydroxyl containing compounds containing a plurality of either phenolic or alcoholic hydroxyl radicals having the general formula, HOROH, where R is polymethylene, alkylene, cycloalkylene, aromatic or aromatic-aliphatic. For example, the compounds formed by replacing the isocyanate groups of the isocyanate compounds listed above with hydroxyl groups would be equally suitable for reacting with isocyanates to form polyurethanes within the scope of this invention. Examples of some polyhydroxy compounds suitable for the polyurethane polymerization reaction are 2,2-di(4-hydroxyphenyl)propane, 2,2-dimethyl-1,3-propane diol, cyclohexanediol-1,4, ethylene glycol, tetramethylene glycol, hexamethylene glycol, octamethylene glycol, decamethylene glycol, triethylene glycol, di($\beta$-hydroxyethyl) ether, resorcinol, p,p'-dihydroxydiphenyl, glycerol, sorbitol, hexamethylenebis(glycolamide), N-phenyl diethanolamine, etc.

It is well known to those skilled in the art that isothiocyanates and polythiol compounds react to produce polyurethanes in a manner similar to the polymerization of isocyanates and polyol compounds. For example, isothiocyanates such as butylene-1,3-diisothiocyanate, ethylidene diisothiocyanate, cyclohexylene-1,2-diisothiocyanate, cyclohexylidene diisothiocyanate, p-phenylene diisothiocyanate, and xylylene-1,4-diisothiocyanate, etc., react, in the presence of my new chelate catalyst, with polythiol compounds such as decamethylene dithio, 1,2,3-trithiolpropane, 1,2,3-trithiolisobutane, thiolresorcinol, ethylene bis(thiol glycolate) etc. to yield corresponding polyurethane compounds.

Chelate compounds suitable as polyurethane polymerization catalysts within the scope of this invention can be prepared from metals in the form in which their coordination numbers are equal to twice their electrovalences, respectively. For example, such chelate compounds can be prepared from copper, beryllium, magnesium, strontium, zinc, mercury, aluminum, indium, lanthanum, cerium, praseodymium, neodymium, samarium, zirconium, chromium, molybdenum, uranium, manganese, iron, cobalt, nickel, platinum, palladium, cesium, cadmium, scandium, thorium, vanadium, gallium, thallium, yttrium, europium, gadolinium, hafnium, lead and plutonium.

I claim:
1. The method of preparing a non-cellular polyurethane comprising reacting an organic compound having, as it sole reacting groups, a plurality of isocyanate groups with an organic compound having, as its sole reacting groups, a plurality of hydroxyl groups in the presence of a chelate having the general formula:

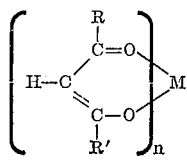

wherein R and R' are unreactive monovalent organic radicals, M is a metal radical having a coordination number equal to twice its electrovalence, and $n$ is an integer which corresponds to the electrovalence of M said reaction being carried out in an essentially neutral environment in the essential absence of water.

2. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of a chelate having the general formula:

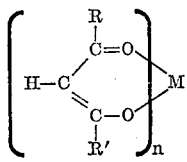

wherein R and R' are unreactive monovalent organic radicals, M is a metal radical having a coordination number equal to twice its electrovalence, and $n$ is an integer which corresponds to the electrovalence of M, said chelate being present in an amount not greater than about 1 percent by weight of the total mass said reaction being carried out in an essentially neutral environment in the essential absence of water.

3. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of a chelate having the general formula:

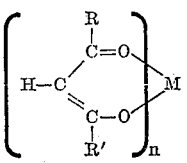

wherein R and R' are aliphatic radicals, M is a metal radical having a coordination number equal to twice its electrovalence and $n$ is an integer which corresponds to the electrovalence of M, said chelate being present in an amount not greater than about 1 percent by weight of the total mass said reaction being carried out in an essentially neutral environment in the essential absence of water.

4. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of a chelate having the general formula:

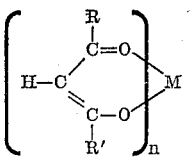

wherein R and R' are aromatic radicals, M is a metal radical having a coordination number equal to twice its electrovalence, and $n$ is an integer which corresponds to the electrovalence of M, said chelate being present in an amount not greater than about 1 percent by weight of the total mass said reaction being carried out in an essentially neutral environment in the essential absence of water.

5. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of a chelate having the general formula:

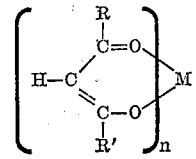

wherein R and R' are alkyl radicals, M is a metal radical having a coordination number equal to twice its electrovalence, and $n$ is an integer which corresponds to the electrovalence of M, said chelate being present in an amount not greater than about 1 percent by weight of the total mass said reaction being carried out in an essentially neutral environment in the essential absence of water.

6. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of ferric acetylacetonate in an amount not greater than about 1 percent by weight of the total mass said reaction being carried out in an essentially neutral environment in the essential absence of water.

7. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of vanadyl acetylacetonate in an amount not greater than about 1 percent by weight of the total mass said reaction being carried out in an essentially neutral environment in the essential absence of water.

8. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of bis(dibenzoylmethane)Cu(II) in an amount not greater than about 1 percent by weight of the total mass said reaction being carried out in an essentially neutral environment in the essential absence of water.

9. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of bis(ethyl acetoacetate)Cu(II) in an amount not greater than about 1 percent by weight of the total mass said reaction being carried out in an essentially neutral environment in the essential absence of water.

10. The method of preparing a non-cellular polyurethane comprising reacting an organic compound having, as its sole reacting groups, a plurality of isocyanate groups with an organic compound having, as its sole reacting groups, a plurality of thiol groups in the presence of a chelate having the general formula:

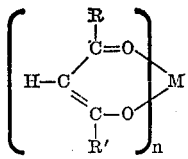

wherein R and R' are unreactive monovalent organic radicals, M is a metal radical having a coordination number equal to twice its electrovalence, and $n$ is an integer which corresponds to the electrovalence of M, said chelate being present in an amount not greater than about 1 percent by weight of the total mass said reaction being carried out in an essentially neutral environment in the essential absence of water.

11. The method of preparing a non-cellular polyurethane comprising reacting an organic compound having, as its sole reacting groups, a plurality of isocyanate groups with an organic compound having, as its sole reacting groups, a plurality of hydroxyl groups in the presence of beryllium acetylacetonate in an amount not greater than about 1 percent by weight of the total mass said reaction being carried out in an essentially neutral environment in the essential absence of water.

12. The method of preparing a non-cellular polyurethane comprising reacting an organic compound having, as its sole reacting groups, a plurality of isocyanate groups with an organic compound having, as its sole reacting groups, a plurality of hydroxyl groups in the presence of cerrous acetylacetonate in an amount not greater than about 1 percent by weight of the total mass said reaction being carried out in an essentially neutral environment in the essential absence of water.

13. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of thorium acetylacetonate in an amount not greater than about 1 percent by weight of the total mass said reaction being carried out in an essentially neutral environment in the essential absence of water.

14. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of aluminum acetylacetonate in an amount not greater than about 1 percent by weight of the total mass said reaction being carried out in an essentially neutral environment in the essential absence of water.

15. The method of preparing a non-cellular polyurethane comprising reacting an organic compound having, as its sole reacting groups, a plurality of isocyanate groups with an organic compound having, as its sole reacting groups, a plurality of hydroxyl groups, in the presence of palladous acetylacetonate in an amount not greater than about 1 percent by weight of the total mass said reaction being carried out in an essentially neutral environment in the essential absence of water.

16. The method of claim 1 wherein at least one of the reactants employed in forming said polyurethane contains a nitro group.

17. The method of claim 2 wherein at least one of the reactants employed in forming said polyurethane contains a nitro group.

18. The method of claim 3 wherein at least one of the reactants used in forming said polyurethane contains a nitro group.

19. The method of claim 4 wherein at least one of the reactants used in forming said polyurethane contains a nitro group.

20. The method of claim 5 wherein at least one of the reactants used in forming said polyurethane contains a nitro group.

21. The method of claim 6 wherein at least one of the reactants used in forming said polyurethane contains a nitro group.

22. The method of claim 10 wherein at least one of the reactants used in forming said polyurethane contains a nitro group.

References Cited by the Examiner

UNITED STATES PATENTS

| 2,897,181 | 7/1959 | Windemuth | 260—77 |
| 2,933,462 | 4/1960 | Fischer | 260—2.5 |
| 2,948,691 | 8/1960 | Windemuth et al. | 260—471 |

FOREIGN PATENTS

| 1,106,561 | 7/1955 | France. |

LORRAINE A. WEINBERGER, *Primary Examiner.*

LEON D. ROSDOL, ROGER L. CAMPBELL, IRVING MARCUS, LEON ZITVER, *Examiners.*